United States Patent [19]

Reineke et al.

[11] 4,360,609
[45] Nov. 23, 1982

[54] CHAR-FORMING THERMOPLASTIC COMPOSITIONS

[75] Inventors: Charles E. Reineke; Kent S. Dennis, both of Midland, Mich.

[73] Assignee: The Dow Chemical Company, Midland, Mich.

[21] Appl. No.: 334,870

[22] Filed: Dec. 28, 1981

[51] Int. Cl.³ ............................................. C09K 3/28
[52] U.S. Cl. .................................. 523/179; 524/158; 525/261; 525/311; 525/312
[58] Field of Search ....................... 523/179; 524/158; 525/261, 311, 312

[56] References Cited

U.S. PATENT DOCUMENTS

| 4,038,245 | 7/1977 | Reineke | 524/158 |
| 4,125,555 | 11/1978 | Reineke | 524/158 |
| 4,224,217 | 9/1980 | Dennis et al. | 524/158 |
| 4,294,785 | 10/1981 | Patton | 524/158 |

Primary Examiner—Morton Foelak
Attorney, Agent, or Firm—Jonathan W. Morse; James B. Guffey

[57] ABSTRACT

The char-forming characteristics of vinyl aromatic polymers are improved by the incorporation therein of (1) active allyl and/or benzyl carbon moieties and (2) an arylsulfonate ester. In an example, a styrenic polymer comprising polyvinylbenzylacetate is given increased char-forming ability by the presence of pentaerythritol parabromobenzenesulfonate.

10 Claims, No Drawings

CHAR-FORMING THERMOPLASTIC COMPOSITIONS

BACKGROUND OF THE INVENTION

This invention relates to char-forming aromatic polymer compositions containing active benzyl and/or allyl carbon moieties together with arylsulfonate esters.

By reason of their desirable physical properties and reasonable cost, aromatic polymers, such as polystyrene, have been used in diverse applications, e.g., as solid molding materials and as foam compositions. Unfortunately, such polymers tend to burn readily and continuously upon exposure to flame.

Aromatic polymer compositions having reduced propensity to burn have generally been prepared by incorporating therein various phosphorous-, nitrogen- and halogen-containing additives. These additives, however, often deleteriously affect the physical properties of the resulting polymeric composition. For example, the halogen-containing materials often have a plasticizing effect on the polymer composition, particularly at the elevated temperatures accompanying a fire. As a result, many aromatic polymer compositions which have been modified to be combustion resistant melt and drip readily upon exposure to flame. It has been recognized that these properties of aromatic polymers can be improved if, while burning, the aromatic polymer forms a rigid char. Such char barrier serves to enhance the structural integrity of the burning polymeric article, to inhibit dripping of molten polymer and to thermally insulate the unburned portion from the heat generated by combustion. Formation of char also reduces the smoke emission of burning polymer compositions.

It has been found that by the use of certain polymers and/or char-inducing additives, the formation of char in aromatic polymers can be induced and/or increased. See, for example, the teachings of U.S. Pat. Nos. 4,038,245 and 4,224,217. However, to date they have presented a rather limited solution in terms of polymers to which they apply and/or in terms of the types of additives involved.

In view of the aforementioned deficiencies of conventional aromatic polymers and the limited number of known char-forming compositions, it would be highly desirable to provide additional char-forming aromatic polymer compositions.

SUMMARY OF THE INVENTION

The present invention is a char-forming, aromatic polymer composition comprising (a) a monovinylidene aromatic polymer, (b) a char-forming amount of active carbon moieties, and (c) a catalyzing amount of an arylsulfonate ester compound. These aromatic polymer compositions are generally useful in any application in which conventional aromatic polymer compositions are employed, such as for molded articles and foamed articles. However, because of their char-forming character, these compositions are particularly useful in the manufacture of housings for electrical equipment, furniture, and the like.

DETAILED DESCRIPTION OF THE INVENTION

The present invention is a normally solid thermoplastic material having present therein a char-forming amount of active carbon moieties. As used herein, the term "active carbons" means benzyl or allyl carbons, bonded to a leaving group whose conjugate acid exhibits a pKa of from about 4.5 to about 16. For the purposes of the present invention, active carbon moieties can be represented generically by the formula:

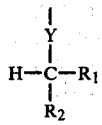

wherein Y is arylene, inertly substituted arylene, ethenylene or inertly substituted ethenylene; $R_1$ can be hydrogen, hydrocarbyl such as alkyl or aryl or other suitably inert monovalent radical; and $R_2$ is the leaving group as described above. For example, $R_2$ can be alkoxy, aryloxy, alkylcarbonyloxy such as acetoxy, arylcarbonyloxy such as benzoyloxy, or hydroxy. "Inertly substituted" or "suitably inert" means that the substituent radical does not impede the formation of the desired char.

While not intending to be limited to any particular theory of operation, it is theorized that under fire temperatures and conditions and in the presence of a suitable catalyst, the aforementioned leaving group dissociates, resulting in a crosslinking site. It is further theorized that crosslinking thereafter occurs from such sites to reactive aromatic hydrocarbon moieties of the monovinylidene aromatic polymer, thereby resulting or aiding in char formation. As used herein, reactive aromatic hydrocarbon moieties are aromatic moieties having one or more ring positions available for substitution. As will be discussed below, the arylsulfonate esters used in the present invention are those which catalyze the dissociation reaction.

The char-forming aromatic polymer composition of the present invention comprises (a) monovinylidene aromatic polymer and (b) active carbon moieties. These two components can be present in the form of a single polymer or copolymer or a blend of two or more polymers or copolymers. In addition, it should be noted that non-polymeric compounds containing a plurality of active carbon moieties may be blended with the monovinylidene aromatic polymer. It should be understood that the active carbon moieties can be incorporated into the char-forming aromatic polymer composition in any of these different ways as long as the molecules of which they are a part comprise a plurality of such moieties. For example, the active carbon moieties can be parts of monomers which are homopolymerized or copolymerized with other monomers and the resulting polymer blended with the monovinylidene aromatic polymer. The active carbon moieties can also be parts of monomers which are copolymerized with a monovinylidene aromatic monomer. The active carbon moieties can even be parts of monovinylidene aromatic monomers which are polymerized to form the monovinylidene aromatic polymer, as in the case of active benzylic carbons. Preferably, the active carbon moieties are chemically combined parts of the monovinylidene aromatic polymer itself. The compound containing the active carbon moiety, whether a homopolymer, copolymer or otherwise, is hereinafter known as the active carbon component. For the purposes of the present invention, the "polymeric component", as used hereinafter, comprises the monovinylidene aromatic polymer component, the active carbon component and, in some aspects of the present invention, other polymerized monomers. It should be noted, that the monovinylidene aromatic polymer component can comprise the active carbon moieties and can therefore be the active carbon component as well. As used hereinafter "reactive aromatic moieties associated with active carbon moieties" refers to situations where an active carbon moiety contains a reactive aromatic moiety (e.g., an active benzylic carbon moiety).

Examples of preferred benzylic monomers for polymerization or copolymerization to form an active carbon component include ethylenically unsaturated benzyl ethers such as monochlorophenyl vinylbenzyl ether, pentachlorophenyl vinylbenzyl ether, trichlorophenyl vinylbenzyl ether, tribromophenyl vinylbenzyl ether, pentabromophenyl vinylbenzyl ether and vinylbenzyl methyl ether; ethylenically unsaturated benzyl esters of carboxylic acids such as vinylbenzyl acetate, vinylbenzyl formate and vinylbenzyl propionate; vinylbenzyl alcohol; vinylbenzyl ethers such as phenyl vinylbenzyl ether and the like. It should be noted that it is also possible in the practice of the present invention to utilize monomers having a plurality of active benzylic carbons to form the active carbon component. Active benzylic comonomers are particularly useful when copolymerized with monovinylidene aromatics, particularly styrene, ar-bromostyrene, ar-(t-butyl)styrene, and vinyl toluene.

Examples of allylic monomers useful in polymerization or copolymerization to form the active carbon component include 2-(pentachlorophenoxymethyl)-butadiene, 2-(methoxymethyl)butadiene, 2-(acetoxymethyl)butadiene, and 2-(hydroxymethyl)butadiene. Like the foregoing benzylic comonomers, the allylic comonomers are suitably copolymerized with the monovinylidene aromatics. Of the benzylic and allylic comonomers, the benzylic ones are preferred.

While it is often desirable to have the active carbon moiety in the char-forming aromatic polymer composition chemically combined with the monovinylidene aromatic polymer component, it is also suitable, as explained above, to incorporate the active carbon moiety into the polymeric component of the char-forming aromatic polymer composition by physically blending thereinto a polymer or other compound containing a plurality of active carbon moieties. Such additive compounds, including the polymers, should exhibit boiling points greater than 200° C., preferably greater than 250° C., and should not decompose under conditions used to incorporate the active carbon additive into the polymer composition or under conditions used to form the char-forming aromatic polymer composition containing the additive into a desired shape. Polymers having a plurality of active benzylic carbon moieties include poly(vinylbenzyl methyl ether), poly(vinylbenzyl tribromophenyl ether), poly(vinylbenzyl alcohol), poly(vinylbenzyl acetate) as well as copolymers having polymerized therein one or more active benzylic carbon-containing monomeric components. Other exemplary compounds having a plurality of benzylic active carbon moieties include bis[4-(chloromethyl)phenyl]oxide, bis(acetoxymethyl)benzene and 4,4'-bis(methoxymethyl)-biphenyl. Exemplary polymers containing a plurality of allylic active carbon moieties include homopolymers and copolymers of 2-(pentachlorophenoxymethyl)-butadiene and 2-(tribromophenoxymethyl)pentadiene. Of the foregoing active carbon additives, the polymers of a poly(halophenyl vinylbenzyl)ether such as pentachlorophenyl and tribromophenyl vinylbenzyl ethers are preferred, with pentachlorophenyl vinylbenzyl ether being especially preferred. These preferred ethers are readily prepared by reacting vinylbenzyl chloride with an alkali metal salt of the appropriate phenol.

The foregoing active carbon components are employed in concentration sufficient to provide a desirable amount of char, the amount desired depending on the use intended for the polymer compositions. In general, however, it is usually desirable to provide at least about 5, preferably from about 10 to about 50, weight percent resultant char based on the weight of the char-forming aromatic polymer composition. Generally the concentrations of active carbon component required to provide desirable char are greater than about 5 equivalent percent of active carbon moiety in the polymeric component, as said polymeric component is defined herein. Preferably such concentrations are greater than about 10 equivalent percent of active carbon moiety in the polymeric component, more preferably greater than about 25 and most preferably greater than about 40 equivalent percent.

As used herein, the term "equivalent percent" of a given moiety in the polymeric component of the char-forming aromatic polymer composition means the percentage of such moieties based on the total number of moieties in the polymeric component, which total number includes the number of active carbon moieties, plus the number of reactive aromatic moieties of the monovinylidene aromatic polymer which are not associated with active carbon moieties, plus the number of other polymerized monomeric moieties present in the polymeric component.

As used herein, monovinylidene aromatic polymer means the addition polymerization product of monovinylidene aromatic monomers with themselves or with other ethylenically unsaturated copolymerizable monomers to form a normally solid thermoplastic polymer or copolymer, which monovinylidene aromatic monomers contain at least one reactive hydrocarbon aromatic moiety of the formula:

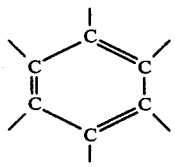

to which is attached prior to polymerization, a radical of the formula:

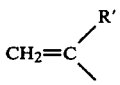

wherein R' is hydrogen or lower alkyl having from 1 to about 4 carbon atoms such as methyl, ethyl, propyl and butyl. R' is preferably hydrogen. By a reactive aromatic moiety is meant that it has one or more ring positions available for substitution.

Preferably, the monovinylidene aromatic monomer is a compound of the formula:

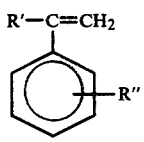

wherein R' is as previously defined and R" is hydrogen, bromine, chlorine or an alkyl radical of from 1 to about 6 carbon atoms. Examples of such preferred species are styrene, α-methylstyrene, ar-methylstyrene, ar-(t-butyl)styrene, ar-chlorostyrene, ar-bromostyrene, and the like. R" is preferably hydrogen.

Most preferably the monovinylidene aromatic monomer is styrene.

In addition to the aforementioned polymerized aromatic monomers and active carbon moieties, the polymeric component may contain other polymerized ethylenically unsaturated monomers. Such other monomers may be present in the form of a copolymer with the monovinylidene aromatic monomer and/or monomers comprising active carbon moieties, in the form of homopolymers of such other monomers; or in the form of a copolymer of such other monomers among themselves. Examples of such other monomers are α,β-ethylenically unsaturated nitriles such as acrylonitrile and methacrylonitrile; alkyl esters of α,β-ethylenically unsaturated carboxylic acids, e.g., ethyl acrylate, butyl acrylate and methyl methacrylate; vinyl esters, e.g., vinyl acetate; α-olefins, e.g., ethylene, propylene and butene-1; conjugated dienes, e.g., butadiene and isoprene; cyclic unsaturated anhydrides, e.g., maleic anhydride, citraconic anhydride, and itaconic anhydride; and similar ethylenically unsaturated monomers. Typically, these additional polymerized ethylenically unsaturated monomers are present in the polymeric component in amounts of less than about 80 equivalent percent of such monomeric moiety in the polymeric component. Preferably, such additional monomers are present in amounts of less than about 50 and most preferably less than about 20 equivalent percent of such monomeric moiety in the polymeric component. It should be noted that the inclusion of these monomers into the polymeric component of the char-forming aromatic composition may not contribute to char-formation. It also follows that the inclusion of higher molecular weight monomeric moieties will bring into the polymeric component larger amounts of mass that do not contribute to char-formation. In those cases larger equivalent percentages than the above-specified minimum amounts of active carbon moieties may be required to achieve desirable char.

The exact ratios of the chosen monomers comprising the polymeric component may vary, as required for a particular application based upon physical property considerations.

Methods for preparing the polymeric component of the present invention are those commonly employed in preparing conventional addition polymers.

The arylsulfonate ester compounds suitable for use in the present invention comprise one or more arylsulfonate ester moieties of the formula Ar—SO$_3$—CH$_2$—, wherein Ar- is an unsubstituted or inertly substituted aryl group. For example, Ar—SO$_3$—CH$_2$— can be a benzene sulfonate ester moiety represented by the formula:

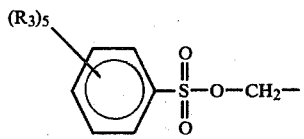

wherein each R$_3$ is individually selected from the group consisting of H, F, Br, Cl, NO$_2$, CH$_3$ and other suitably inert substituents. "Inertly substituted" and "suitably inert substituents" mean that such substituents do not impede either the desired char-formation or the catalytic effect of the arylsulfonate esters by which such desired char-formation is induced.

The arylsulfonate ester compounds suitable for use in the present invention can generally be represented by the formula:

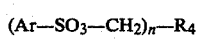

wherein n is a positive integer and R$_4$ is an n-valent hydrocarbyl radical, an inertly substituted n-valent hydrocarbyl radical or, if n is equal to 1, it could consist essentially of another arylsulfonate ester moiety. Preferably, n is from 1 to about 9, more preferably from 1 to about 6, and most preferably 1 to 4.

Preferably such R$_4$ radical contains from 1 to about 9 valency carbon atoms, more preferably from 1 to about 3 valency carbon atoms, and most preferably 1 valency carbon atom. As used herein, valency carbon atom means a carbon atom, within the radical R$_4$, which is bonded to one or more arylsulfonate ester moieties, as previously defined.

As used herein, n-valent means that the radical R$_4$ is bonded to n arylsulfonate ester moieties.

The valency carbons in a hydrocarbyl R$_4$ radical themselves can be primary, secondary or tertiary. This means that the valency carbon atom of the radical can be bonded to 1, 2 or 3 other carbon atoms besides an arylsufonate ester moiety; which other carbon atoms can include those in additional arylsulfonate ester moieties.

The term "inertly substituted" means that the hydrocarbyl radical contains substituents, such as halogen atoms, and chain linkages, such as oxygen or sulfur atoms, which do not interfere with the preparation of the arylsulfonate ester of the catalytic effect thereof. Thus, for example, inertly substituted hydrocarbyl radicals can include halogenated hydrocarbyl radicals; hydrocarbyloxy radicals; and hydrocarbylthio radicals. While the total carbon content of the radical R$_4$ is not critical, it will generally contain from 1 to about 40, preferably from 1 to about 24, more preferably from 1 to about 18, and most preferably 1 carbon atom.

In the arylsulfonate esters suitable for use in the present invention, R$_4$ can consist essentially of another arylsulfonate ester moiety (preferably but not necessarily, the same as the first) in which case n will be 1. Preferably R$_4$ is comprised essentially of a tetravalent or bivalent carbon atom or a second arylsulfonate ester.

The arylsulfonate esters suitable for use in the present invention are those which catalyze the char-formation reaction in the polymeric component. Though it is not intended to be limited to any particular theory of operation, it is theorized that this catalytic effect is due to the thermally activated dissociation of the Ar—SO$_3$— radical which then catalyzes the leaving of the group bonded to the active benzyl and/or allyl carbon moieties. It is therefore desirable that the arylsulfonate esters (a) dissociate at or near flame temperatures, (b) do not themselves form a char whereby the radicals are not free to catalyze the char formation of the polymeric component, and (c) are sufficiently stable to withstand the conditions involved with incorporating such esters into the aromatic polymer composition and with processing the aromatic polymer compositions without dissociating.

Some preferred arylsulfonate esters and their melting points are shown in Table I below.

TABLE I

| | ARYLSULFONATE ESTERS | | |
|---|---|---|---|
| Ester | Name | Structure | Melting Point (°C.) |
| 1 | Pentaerythrityl p-bromobenzene-sulfonate | (Br—⟨O⟩—SO$_2$OCH$_2$)$_4$C | 174–176 |
| 2 | 1,2-ethanediyl p-bromobenzene-sulfonate | (Br—⟨O⟩—SO$_2$OCH$_2$)$_2$ | 148–150 |
| 3 | Pentaerythrityl benzenesulfonate | (⟨O⟩—SO$_2$OCH$_2$)$_4$C | 101–103 |

The arylsulfonate esters used in the practice of the present invention can be conveniently prepared according to the procedure described in U.S. Pat. No. 2,703,808 to Buchman or by an alternate procedure described by R. N. McDonald and C. E. Reineke in *J. Org. Chem.*, 32, 1978 (1967).

The aforementioned arylsulfonate esters are present in the char-forming compositions of the invention in a catalyzing amount. As used herein, the phrase "char-forming composition" means a composition characterized by formation of char upon combustion. The term "catalyzing amount" means that amount required to cause the composition containing the active carbon component to form increased char, as hereinafter defined, upon combustion as compared to the amount of char formed by the composition without the arylsulfonate esters.

By the term "char" is meant a black, dry solid which appears upon the surface of a polymeric article upon combustion and before cooling. Such solid is distinct and readily separable from the underlying polymer after cooling and is visually observable without the aid of magnification. The amount of char formed can be expressed as a percentage by measuring the weight of residual char remaining after a sample has been exposed to elevated temperatures and comparing such weight to the weight of the sample before exposure to the elevated temperature. Such measurement technique is often called thermogravimetric analysis.

The maximum amount of char formation attainable for a given composition of the invention is dependent upon the amounts of the critical moieties (i.e., the reactive aromatic moieties and the active carbon moieties where cross-linking is theorized as occurring) present in the polymeric component. For any particular polymeric component, the amount of char formation relative to the maximum achievable for such composition is dependent upon the arylsulfonate ester content of the composition. Thus, although it is necessary that only a catalytic amount of the arylsulfonate ester be used, a larger amount of the ester may be advantageously used to achieve the maximum char-forming potential of the chosen polymeric component.

As a general rule, however, the arylsulfonate ester is beneficially present in an amount sufficient to provide from about 0.2 to about 50, preferably from about 0.5 to about 20, equivalent percent of arylsulfonate ester moiety of the formula

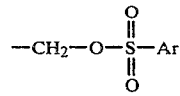

in the presently invented char-forming composition. The larger amounts are generally used when benzyl and/or allyl carbons are bonded to leaving groups of a higher pKa (i.e., groups which leave "less easily").

As used herein, the term "equivalent percent of arylsulfonate ester moiety" is defined by the following equation:

$$\text{equivalent percent of arylsulfonate ester moiety} = \frac{\text{equivalents arylsulfonate ester moiety in the char-forming composition}}{\text{equivalents arylsulfonate ester moiety in the char-forming composition} + \text{equivalents active carbon moiety in the char-forming composition}} \times 100$$

In other words, the amount of arylsulfonate ester beneficially desirable in the present invention depends on the number of active carbon moieties present in a particular char-forming composition.

The char-forming compositions of this invention optionally may contain a small but effective amount of a halogenated organic compound for conventional combustion inhibition. Any such compound which is compatible with the polymer component may be employed. Examples of such compounds are (a) organic compounds which contain from about 25 to about 90 weight percent chlorine available for dehydrochlorination or dechlorination, such as chlorinated paraffins, chlorinated polyethylene, chlorinated castor oil, chlorinated tall oil, chlorinated cyclic hydrocarbons (e.g., hexachlorocyclohexane, hexachlorododecane, etc.), chlorinated acyclic hydrocarbons (e.g., hexachloroethane, pentachloroethane, hexachloropropane, etc.), and the like; (b) organic compounds which contain from about 30 to about 95 weight percent bromine available for dehydrobromination or debromination, such as hexabromocyclohexane, lower brominated cyclohexanes, octabromododecane, 1,2,3,4-tetrabromobutane, 1,2-dibromoethylbenzene, hexabromoethane, acetylene tetrabromide, hexabromocyclododecane, octabromohexadecane, and the like; (c) brominated organic compounds having bromine atoms(s) substituted on aromatic or vinyl carbon atoms or otherwise situated so that no α-hydrogen or α-halogen is available for normal dehydrohalogenation or dehalogenation, such as hexabromobenzene, pentabromobenzene, decabromodiphenyl oxide, pentabromodiphenyl ether, tribromoneopentyl alcohol and esters thereof, bis(2,3-dibromo-2-butanediol) ester of tris(bromomethyl)acetic acid, and the like; and (d) counterparts of such exemplified organic compounds wherein such counterpart contains both bromine and chlorine rather than bromine or chlorine alone.

Such halogenated organic compounds, if used, will generally be present in an amount of from about 2 to about 25, preferably from about 5 to about 15 percent by weight based upon the total weight of the char-forming composition.

In fact, the compositions of this invention containing bromine and/or chlorine, such as where the bromine and/or chlorine is present in conjunction with a separate halogenated additive as above-described, as an integral part of the polymeric component or as inert substituents of the arylsulfonate ester compound, are of particular interest in the practice of this invention since such compositions exhibit conventional combustion inhibition in combination with char-forming characteristics.

Further, the compositions of the invention can optionally contain other additives such as pigments, thermal stabilizers, U.V. stabilizers, antistatic agents, etc. Care should be exercised in the use of such other additives that the additives chosen and the amounts used do not deleteriously affect the char-forming characteristics of the composition of the invention.

The arylsulfonate ester compounds as well as the aforementioned optional additives can be combined with the polymeric component to form the composition of the invention by any of the usual methods, such as extrusion compounding, roll milling, solution blending and the like.

The resulting char-forming compositions are readily fabricated into desired useful articles by conventional fabrication means such as injection molding, extrusion and the like.

The practice of the invention is further illustrated by the following examples.

EXAMPLES

Example 1

Preparation of Polymers

The monomers indicated in the following Table II were polymerized in ethylbenzene solvent in small bottles in an oil bath at 135° C., each bottle of monomer solution having been flushed with nitrogen before being capped and placed in the bath. After the polymerization reaction was completed, the polymers were separated from the ethyl benzene, dissolved to about 10% solids in tetrahydrofuran, precipitated in about 10 times their volume of methanol, collected by filtration and dried under vacuum.

TABLE II

PREPARATION OF THE POLYMERIC COMPONENTS CONTAINING ACTIVE CARBON MOIETIES

| Polymer No. | Monomer 1 (g/Name) | Monomer 2 (g/Name) | Solvent (grams) | Polymerization Time | Eq. % Active Carbon Moiety[1] |
|---|---|---|---|---|---|
| 1 | 10.0 Vinyl Benzyl Acetate | — | 2.00 | 5 Days | 100 |
| 2 | 2.77 Vinyl Benzyl Acetate | 7.23 Styrene | 1.00 | 6 days | 18.4 |
| 3 | 2.00 Methyl Vinyl Benzyl Ether | — | — | Several Days | 100 |
| 4 | 4.86 Methyl Vinyl Benzyl Ether | 5.14 Styrene | 1.00 | 4.5 Days | 39.8 |
| 5* | Styrene | — | — | — | — |

*Polymer No. 5 is STYRON® 678, a general purpose polystyrene commercially produced by The Dow Chemical Company. Such polymer was tested for comparison only, and does not represent an example of an active-carbon-containing polymer suitable for use in the present invention since it contains no active carbon moieties as herein-above defined.

[1]Equivalent percent active carbon moiety in the polymeric component calculated from amounts of monomer polymerized.

Example 2

Char-Formation of Components and Combinations

As shown below in Table III, samples of the ester additives from Table I and the polymers from Table II by themselves and various combinations of the two components were prepared and tested for char-formation.

In making the below indicated combinations, the polymers and arylsulfonate ester additives were solution blended in the desired portions in methylene chloride and devolatilized to a viscous syrup on a hot plate. The samples were then further devolatilized in a vacuum oven at 80°–100° C. for several hours, ranging from 2 to 14 hours for individual samples. The char yield of the individual components and the various indicated combinations thereof are shown below in Table III. The char yield of a composition was determined by thermogravimetric analysis on a DuPont 990 thermoanalyzer in a nitrogen atmosphere at a temperature program rate of 100° C./min. The char yield $Y_c$ is shown as the weight percent residue after heating to 850° C., based on the weight of the aromatic polymer composition.

TABLE III

CHAR-FORMATION OF COMPONENTS AND COMBINATIONS

| Sample No. | Polymer No.[1] | Ester Additive No.[2] | Ester Additive Amount Wt. %[3] | Eq. %[4] | % $Y_c$[5] |
|---|---|---|---|---|---|
| 1* | — | 1 | 100 | 100 | 5 |
| 2* | — | 2 | 100 | 100 | 4 |
| 3* | — | 3 | 100 | 100 | 9 |
| 4* | 5 | — | 0 | 0 | 0 |
| 5* | 5 | 1 | 15 | 0 | less than 1 |
| 6* | 1 | — | 0 | 0 | 11 |
| 7 | 1 | 1 | 1 | .7 | 20 |
| 8 | 1 | 1 | 2 | 1.4 | 23 |
| 9 | 1 | 1 | 3 | 2.1 | 27 |
| 10 | 1 | 1 | 5 | 3.5 | 30 |
| 11 | 1 | 1 | 7 | 5.0 | 31 |
| 12 | 1 | 1 | 15 | 10.5 | 27 |
| 13 | 1 | 2 | 10 | 7.3 | 28 |
| 14 | 1 | 3 | 5 | 5.1 | 24 |
| 15 | 1 | 3 | 10 | 10.1 | 26 |
| 16 | 1 | 3 | 15 | 15.2 | 26 |
| 17* | 2 | — | 0 | 0 | 0 |
| 18 | 2 | 1 | 10 | 29.5 | 8 |
| 19* | 3 | — | 0 | 0 | 4 |
| 20 | 3 | 1 | 5 | 3.0 | 22 |
| 21* | 4 | — | 0 | 0 | less than 1 |
| 22 | 4 | 1 | 5 | 7.2 | 12 |

TABLE III-continued
CHAR-FORMATION OF COMPONENTS AND COMBINATIONS

| Sample No. | Polymer No.[1] | Ester Additive No.[2] | Ester Additive Amount Wt. %[3] | Eq. %[4] | % Y$_c$[5] |
|---|---|---|---|---|---|
| 23 | 4 | 1 | 15 | 20.7 | 16 |

*Control samples, not examples of the present invention.
[1] The polymer corresponding to the indicated polymer No. is shown in Table II above.
[2] The ester additive corresponding to the indicated ester additive No. is shown in Table I above.
[3] Weight percent ester additive in the char-forming polymeric composition.
[4] Equivalent percent arylsulfonate ester moiety in the char-forming polymeric composition.
[5] Weight percent char yield based on the weight of the aromatic polymer composition.

As shown in the above Table III, the char-forming capability of the active carbon component is appreciably increased by the addition of the arylsulfonate ester compound. Neither component by itself contributes appreciably to the overall char-formation of the tested compositions.

While the present invention has been described by examples of particular embodiments thereof, such embodiments are not to be interpreted as limiting the scope of the instant claimed invention. Other suitable embodiments will be obvious to one skilled in the art and are included in the scope of the instantly claimed invention.

What is claimed is:

1. A char-forming aromatic polymer composition comprising:
   (a) a monovinylidene aromatic polymer,
   (b) a char-forming amount of a plurality of active benzyl carbon and/or active allyl carbon moieties, and
   (c) a catalyzing amount of an arylsulfonate ester compound wherein the arylsulfonate ester compound comprises one or more arylsulfonate ester moieties of the formula: $Ar-SO_3-CH_2-$, wherein Ar is an unsubstituted or inertly substituted aryl group.

2. The char-forming composition according to claim 1 wherein the arylsulfonate ester compound is selected from the group consisting of pentaerythrityl p-bromobenzenesulfonate, 1,2-ethanediyl p-brompbenzenesulfonate and pentaerythrityl benzenesulfonate.

3. The char-forming composition according to claim 1 wherein the amount of the arylsulfonate ester moiety present in the composition is from about 0.2 to about 50 equivalent percent, based on the number of arylsulfonate ester and active carbon moieties in the char-forming polymer composition.

4. The char-forming composition according to claim 3 wherein the amount of sulfonate ester moiety present in the composition is from about 0.5 to about 20 equivalent percent based on the number of arylsulfonate ester and active carbon moieties in the char-forming polymer composition.

5. The char-forming composition according to claims 3 or 4 wherein the active benzyl and/or allyl carbon moieties are present in a concentration greater than about 5 equivalent percent based on the combined polymerized monovinylidene aromatic monomer and active carbon components, such combination being termed the polymeric component.

6. The char-forming composition according to claim 5 wherein the active carbon moieties are present in a concentration greater than about 10 equivalent percent in the polymeric component.

7. The char-forming composition according to claim 1 wherein the active carbon moieties are benzyl.

8. The char-forming composition according to claim 7 wherein the active carbon moieties are present in the form of polymerized monomeric units selected from the group consisting of vinyl benzyl acetate and methyl vinyl benzyl ether.

9. The char-forming composition according to claim 8 wherein the monovinylidene aromatic polymer is a homopolymer or copolymer of styrene.

10. The composition according to claim 1 wherein the polymeric component comprises the copolymerization product of a monovinylidene aromatic monomer and a different copolymerizable monomer comprising the active carbon moieties.

* * * * *